(12) United States Patent
Zuo

(10) Patent No.: US 10,971,189 B2
(45) Date of Patent: Apr. 6, 2021

(54) SPECIAL EFFECT SYNCHRONIZATION METHOD AND APPARATUS, AND MOBILE TERMINAL

(71) Applicant: BEIJING DAJIA INTERNET INFORMATION TECHNOLOGY CO., LTD., Beijing (CN)

(72) Inventor: Shicheng Zuo, Beijing (CN)

(73) Assignee: BEJING DAJIA INTERNET INFORMATION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/650,733

(22) PCT Filed: Sep. 25, 2018

(86) PCT No.: PCT/CN2018/107331
§ 371 (c)(1),
(2) Date: Mar. 25, 2020

(87) PCT Pub. No.: WO2019/057202
PCT Pub. Date: Mar. 28, 2019

(65) Prior Publication Data
US 2020/0312370 A1   Oct. 1, 2020

(30) Foreign Application Priority Data
Sep. 25, 2017   (CN) .......................... 201710876308.6

(51) Int. Cl.
*G11B 27/036*   (2006.01)
*G10L 25/51*   (2013.01)
(Continued)

(52) U.S. Cl.
CPC ............ *G11B 27/036* (2013.01); *G10L 25/51* (2013.01); *G11B 27/34* (2013.01); *H04N 5/265* (2013.01);
(Continued)

(58) Field of Classification Search
None
See application file for complete search history.

(56) References Cited

U.S. PATENT DOCUMENTS

| 2011/0072955 | A1* | 3/2011 | Turner | G10H 7/00 |
| | | | | 84/612 |
| 2014/0164454 | A1* | 6/2014 | Zhirkov | G06F 16/185 |
| | | | | 707/829 |
| 2014/0372891 | A1* | 12/2014 | Winters | H04N 21/8113 |
| | | | | 715/722 |

FOREIGN PATENT DOCUMENTS

| CN | 102117638 A | 7/2011 |
| CN | 103928039 A | 7/2014 |

(Continued)

OTHER PUBLICATIONS

International Search Report and Written Opinion issued by the International Searching Authority (ISA/US) in PCT Application No. PCT/CN2018/107331 dated Dec. 28, 2018. 11 pages.

*Primary Examiner* — Eileen M Adams
(74) *Attorney, Agent, or Firm* — Meunier Carlin & Curfman LLC

(57) ABSTRACT

A special effect synchronization method and apparatus, and a mobile terminal are provided. The method comprises: when a confirmation operation of a user for selecting music for a specified video file is received, downloading a music file selected by the user and a corresponding rhythm information file from a server; when the specified video file is played, playing the music file and adding a special effect according to the rhythm information file; and after the playback of the specified video file is ended, synthesizing the specified video file, the music file, and the special effect, and storing the same. Therefore, the problem of low activity (Continued)

of users due to monotonous matched music files can be solved, and a beneficial effect of improving the activity of users is achieved.

11 Claims, 5 Drawing Sheets

(51) Int. Cl.
  *G11B 27/34* (2006.01)
  *H04N 5/265* (2006.01)
  *H04N 5/60* (2006.01)
  H04L 29/08 (2006.01)
  H04W 88/02 (2009.01)

(52) U.S. Cl.
  CPC ......... *H04N 5/60* (2013.01); *G10H 2210/071* (2013.01); *H04L 67/06* (2013.01); *H04W 88/02* (2013.01)

(56) References Cited

FOREIGN PATENT DOCUMENTS

| | | | |
|---|---|---|---|
| CN | 104244043 | A | 12/2014 |
| CN | 104427259 | A | 3/2015 |
| CN | 104581348 | A | 4/2015 |
| CN | 107124624 | A | 9/2017 |
| EP | 3151548 | A1 | 4/2017 |
| KR | 20140093398 | A | 7/2014 |

\* cited by examiner

SPECIAL EFFECT SYNCHRONIZATION METHOD AND APPARATUS, AND MOBILE TERMINAL

The present application is a US National Stage of International Application No. PCT/CN2018/107331, filed on Sep. 25, 2018, which claims the priority of Chinese patent application No. 201710876308.6, filed with Chinese Patent Office on Sep. 25, 2017, and entitled "Special Effect Synchronization Method and Apparatus and Mobile Terminal", the content of which is incorporated by reference herein in its entirety.

FIELD

The present application relates to the technical field of software application, in particular to a special effect synchronization method and apparatus and a mobile terminal.

BACKGROUND

Along with rapid development of the mobile terminal technology, application software with various functions arises at the right moment, bringing convenience and amusement to users. Among which, adding videos captured by users themselves with synchronized played music has become a popular entertainment fashion for users.

In related art, when a piece of music is selected for a certain video by users, a music file is downloaded firstly from the network or other places; then the music file is played when the certain video file is played; and finally the music file and the video file are synthesized into a target file, as such, when the video is opened and played by users, the music file will be played synchronously as background music.

However, in the above process, the matched music file is monotonous, thereby leading to a low activity of users.

SUMMARY

The special effect synchronization method and apparatus and the mobile terminal provided in an embodiment of the present application can overcome the problem of low activity of users due to monotonous matched music files, and can solve the problem of low activity of users through adding special effects on the rhythm points.

In a first aspect, the present application provides a special effect synchronization method, including:

when a confirmation operation of a user for selecting music for a specified video file is received, downloading a music file selected by the user and a corresponding rhythm information file from a server;

when the specified video file is played, playing the music file and adding a special effect according to the rhythm information file; and after the playback of the specified video file is ended, synthesizing the specified video file, the music file, and the special effect, and storing the same.

Optionally, the step of adding a special effect according to the rhythm information file includes:

for each rhythm point in the rhythm information file, if the intensity of the rhythm point is greater than a specified threshold, adding a special effect when playing to the rhythm point.

Optionally, before the step of downloading a music file selected by the user and a corresponding rhythm information file from a server when a confirmation operation of a user for selecting music for a specified video file is received, the method further includes:

analyzing the specified music file in the server, and marking a timestamp corresponding to the rhythm point in the specified music file;

storing the timestamps corresponding to all the rhythm points of the specified music file in the rhythm information file; and uploading the rhythm information file to a server.

Optionally, before the step of uploading the rhythm information file to a server, the method further includes:

adding a file identification of the specified music file to a file header of a rhythm information file; or, determining a file name of the rhythm information file according to the file identification of the specified music file.

Optionally, the step of downloading a music file selected by the user and a corresponding rhythm information file from a server includes:

searching for a corresponding rhythm information file from the server according to the file identification of the music file; and downloading a music file selected by the user and the rhythm information file from a server.

In a second aspect, the present application provides a special effect synchronization apparatus, including:

a file downloading module, configured to download a music file selected by the user and a corresponding rhythm information file from a server when a confirmation operation of a user for selecting music for a specified video file is received;

a special effect adding module, configured to play the music file and add a special effect according to the rhythm information file when the specified video file is played; and a special effect synchronization module, configured to synthesize the specified video file, the music file, and the special effect, and store the same after the playback of the specified video file is ended.

Optionally, the special effect adding module includes:

a special effect adding sub-module, configured to add a special effect when playing to the rhythm point for each rhythm point in the rhythm information file, if the intensity of the rhythm point is greater than a specified threshold.

Optionally, before the file downloading module, the apparatus further includes:

a rhythm point marking module, configured to analyze the specified music file in the server, and mark a timestamp corresponding to the rhythm point in the specified music file;

a rhythm information file generating module, configured to store the timestamps corresponding to all the rhythm points of the specified music file in the rhythm information file; and a rhythm information file uploading module, configured to upload the rhythm information file to a server.

Optionally, before the rhythm information file uploading module, the apparatus further includes:

a first file identification adding module, configured to add a file identification of the specified music file to a file header of a rhythm information file;

or a second file identification adding module, configured to determine a file name of the rhythm information file according to the file identification of the specified music file.

Optionally, the file downloading module includes:

a rhythm information file searching sub-module, configured to search for a corresponding rhythm information file from the server according to the file identification of the music file; and a file downloading sub-module, configured to download a music file selected by the user and the rhythm information file from a server.

In a third aspect, the present application provides a mobile terminal, including a processor; and a memory configured to store executable instructions of the processor;

wherein the processor is configured to:

download a music file selected by the user and a corresponding rhythm information file from a server when a confirmation operation of a user for selecting music for a specified video file is received;

play the music file and add a special effect according to the rhythm information file when the specified video file is played; and synthesize the specified video file, the music file, and the special effect, and store the same after the playback of the specified video file is ended.

In a fourth aspect, the present application provides a non-temporary computer readable storage medium, configured to enable the mobile terminal to perform a special effect synchronization method when the instructions in the storage medium are executed by a processor of the mobile terminal, wherein the method includes:

downloading a music file selected by the user and a corresponding rhythm information file from a server when a confirmation operation of a user for selecting music for a specified video file is received;

playing the music file and adding a special effect according to the rhythm information file when the specified video file is played; and synthesizing the specified video file, the music file, and the special effect, and storing the same after the playback of the specified video file is ended.

In a fifth aspect, the present application provides a computer program product containing instructions. When the computer program product is running on a computer, the computer can be enabled to perform the special effect synchronization method as mentioned in the first aspect.

It can be seen from the above technical solution that, when a confirmation operation of a user for selecting music for a specified video file is received, a music file selected by the user and a corresponding rhythm information file are downloaded from a server; when the specified video file is played, the music file is played and a special effect is added according to the rhythm information file; and after the playback of the specified video file is ended, the specified video file, the music file, and the special effect are synthesized and stored. Therefore, the problem of low activity of users due to monotonous matched music files can be solved, and a beneficial effect of improving the activity of users is achieved.

The above description is merely a summary of the technical solution of the present application. In order to more clearly understand the technical means of the present application, such that the technical means can be implemented based on contents in the description, and in order to make the above and other objectives, characteristics and advantages of the present application more obvious and understandable, specific embodiments of the present application will be enumerated below.

BRIEF DESCRIPTION OF DRAWINGS

The drawings herein are incorporated into the description and constitute a part of the present description. The drawings show embodiments complying with the present invention, and are used for explaining principles of the present invention together with the description.

DETAILED DESCRIPTION OF THE EMBODIMENTS

A clear and complete description of the technical solutions of embodiments of the present application will be given below in combination with the accompanying drawings in embodiments of the present application. Obviously, the described embodiments are only a part, but not all, of the embodiments of the present application. Based on the embodiments of the present application, all the other embodiments obtained by those of ordinary skill in the art without any creative effort shall all fall into the protection scope of the present application.

A special effect synchronization method and apparatus and a mobile terminal provided in the present application will be introduced in detail below through several particular embodiments.

Embodiment 1

Figure 1A:
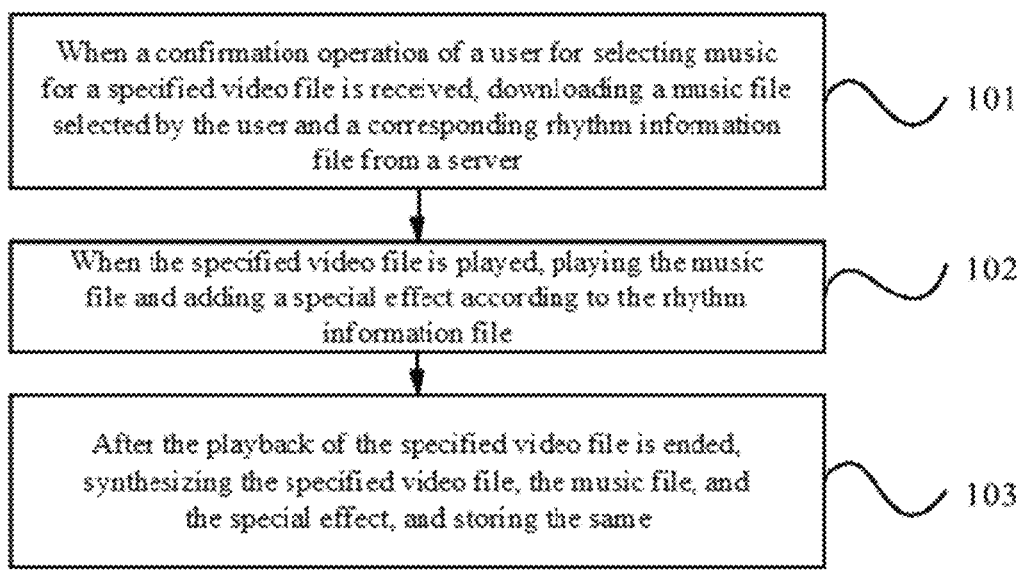
FIG. 1A shows a flow chart of steps of a special effect synchronization method in Embodiment 1 of the present application.

Please refer to FIG. 1A which shows a flow chart of steps of a special effect synchronization method in Embodiment 1 of the present application, and particularly, the following steps are included.

Step 101, when a confirmation operation from a user for selecting music for a specified video file is received, downloading, from a server, a music file selected by the user and a corresponding rhythm information file.

Embodiments of the present application are applicable to all the applications equipped with a music adding function for a video file, for example, Kwai.

Here the specified video can be a video captured by a user, and can also be a video stored locally or downloaded from the network, and this is not limited in an embodiment of the present application.

A rhythm information file stores rhythm points in a music file and corresponding timestamp information.

When a target music file is selected by a user on a server, the music file and its corresponding rhythm information file will be downloaded, so that a special effect can be added according to the rhythm information file.

Figure 1B:
FIG. 1B shows a schematic diagram of an interface added with special effects in an embodiment of the present application.

In actual applications, a special effect can also be turned on or off. As shown in the FIG. 1B, the special effect is turned on or off through a special effect button on a top right corner. When the special effect button is lighted up, the special effect is turned on; and when the special effect button is darkened, the special effect is turned off. Particularly, the special effect is turned off by default during first use, and users are prompted to light up the special effect button to turn on the special effect. It can be understood that, for a music file with no rhythm information file, the special effect button is ashed, therefore, users cannot light up the special effect button, or the special effect button is not displayed.

Step 102, when the specified video file is played, playing the music file and adding a special effect according to the rhythm information file.

In actual applications, the music can be matched and a special effect can be added as well when a user captures a video.

In particular, when a music file is played, a special effect is added automatically if a timestamp corresponding to a rhythm point recorded in the rhythm information file is reached. Where the special effect can be any special effect in a special effect library, and can also be a special effect added by a user himself. It can be understood that, the special effect of each rhythm point can be the same or different.

Step 103, after the playback of the specified video file is ended, synthesizing the specified video file, the music file, and the special effect, and storing the same.

In actual applications, for a video being captured, the video file, the music file and the special effect can be synthesized into one file after the operation indicating finish of video capturing of a user is received.

It can be understood that, the synthesized file is stored in a specified path of the current terminal. Therefore, the user can upload the synthesized file to a server, copy the file, and send the file to other clients through various application softwares.

In embodiments of the present application, when a confirmation operation from a user for selecting music for a specified video file is received, a music file selected by the user and a corresponding rhythm information file are downloaded from a server; when the specified video file is played, the music file is played and a special effect is added according to the rhythm information file; and after the playback of the specified video file is ended, the specified video file, the music file, and the special effect are synthesized and stored. Therefore, the problem of low activity of users due to monotonous matched music files can be solved, and a beneficial effect of improving the activity of users is achieved.

Embodiment 2

Figure 2:
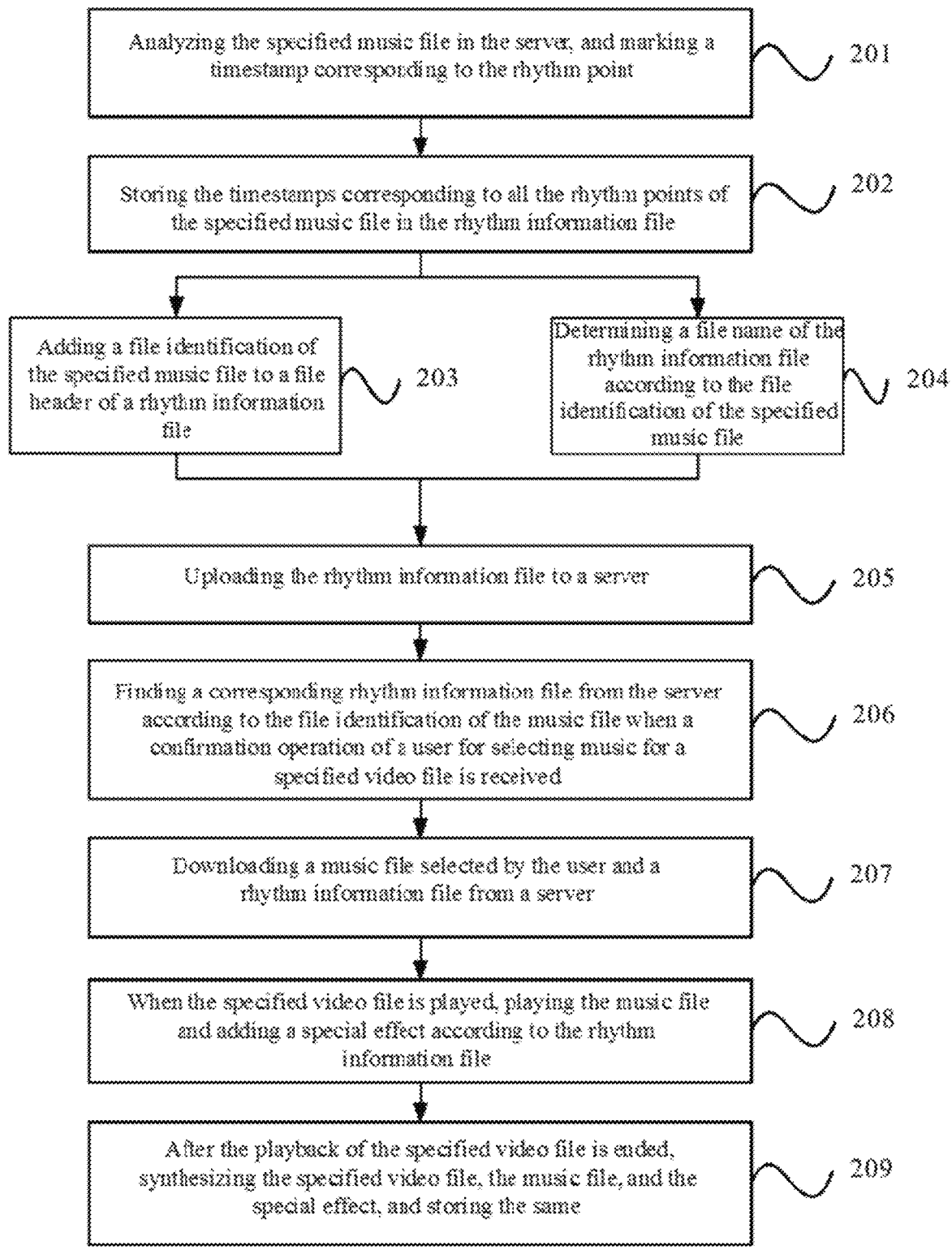
FIG. 2 shows a flow chart of steps of a special effect synchronization method in Embodiment 2 of the present application.

Please refer to FIG. 2 which shows a flow chart of steps of a special effect synchronization method in Embodiment 2 of the present application, and specifically, the following steps are included.

Step 201, analyzing the specified music file in the server, and marking timestamps corresponding to the rhythm points in the specified music file.

Here, the timestamps can be accurate to a millisecond level.

Specifically, rhythm points of a music file can be specified through programs or manual analysis and can be marked, so as to write all the rhythm points uniformly to a rhythm information file at one time.

Step 202, storing the timestamps corresponding to all the rhythm points of the specified music file in the rhythm information file.

Specifically, a rhythm information file is created under a specified path and is opened, then the timestamps corresponding to all the rhythm points are written to a rhythm information file at one time, and finally the rhythm information file is closed.

Step 203, adding a file identification of the specified music file to a file header of the rhythm information file.

In actual applications, in order to establish a corresponding relationship between the music file and the rhythm information file, a file identification of a specified music file can be added to the rhythm information file. Therefore, a corresponding rhythm information file can be found according to a file identification.

Specifically, a file identification of a music file can be written to a file header of the rhythm information file.

Step 204, determining a file name of the rhythm information file according to the file identification of the specified music file.

Specifically, a file identification, a prefix and/or a suffix of a music file can be combined to form a file name of a corresponding rhythm information file. For example, if the file identification of a specified music file is 123456, then the file name of a rhythm information file can be XX123456XX. It can be understood that, in embodiments of the present application, the positions and forms of the prefix and suffix are not limited.

It can be understood that, in step 203 and step 204, the corresponding relationship between a music file and a rhythm information file is established through a file identification. In actual applications, one of them can be chosen.

Step 205, uploading the rhythm information file to a server.

Here, the server is a remote server corresponding to an application which adds music for a video. A rhythm information file is saved to a specified path in the server, and the path is different from the path of the music file.

Specifically, after a rhythm information file is uploaded to a server, the rhythm information file saved locally can be deleted or not deleted, which needs to be determined according to actual application scenarios.

It can be understood that, the rhythm information file needs to be uploaded to a server through the network, for example, a wireless local area network or a mobile data network.

Step 206, searching for a corresponding rhythm information file from the server according to the file identification of the music file when a confirmation operation from a user for selecting music for a specified video file is received.

In step 203, as to each rhythm information file under a specified path in a server, the file identification of the corresponding music file is read from a file header, and if the file identification is the file identification of the music file selected by the user, then the rhythm information file is the rhythm information file corresponding to the music file.

In step 204, as to each rhythm information file under a specified path in a server, the file name of each file is obtained, and if the file name contains the file identification of the music file selected by the user, then the rhythm file is the rhythm information file corresponding to the music file.

Step 207, downloading the music file selected by the user and the rhythm information file from the server.

Specifically, through a wireless local area network or a mobile data network, the music file and the rhythm information file are downloaded from the server to a local temporary cache. After a video with specific effects is synthesized, the music file and the rhythm information file are deleted from the local temporary cache.

Step 208, when the specified video file is played, playing the music file and adding a special effect according to the rhythm information file.

For this step, please refer to detailed description of step 102, and this step will not be repeated redundantly herein.

Optionally, in another embodiment of the present application, step 208 includes a sub-step 2081.

Sub-step 2081, for each rhythm point in the rhythm information file, if the intensity of the rhythm point is greater than a specified threshold adding a special effect when playing to the rhythm point.

Here a specified threshold can be set according to actual application scenarios, and is not limited in an embodiment of the present application.

Step 209, after the playback of the specified video file is ended, synthesizing the specified video file, the music file, and the special effect, and storing the same.

For this step, please refer to detailed description of step 103, and this step will not be repeated redundantly herein.

In embodiments of the present application, when a confirmation operation from a user for selecting music for a specified video file is received, a music file selected by the user and a corresponding rhythm information file are downloaded from a server; when the specified video file is played, the music file is played and a special effect is added according to the rhythm information file; and after the playback of the specified video file is ended, the specified video file, the music file, and the special effect are synthesized and stored. Therefore, the problem of low activity of users due to monotonous matched music files can be solved, and a beneficial effect of improving the activity of users is achieved. In addition, rhythm points of a music file can also be analyzed in advance, so as to add special effects according to rhythm points.

Embodiment 3

Figures 3, 4:
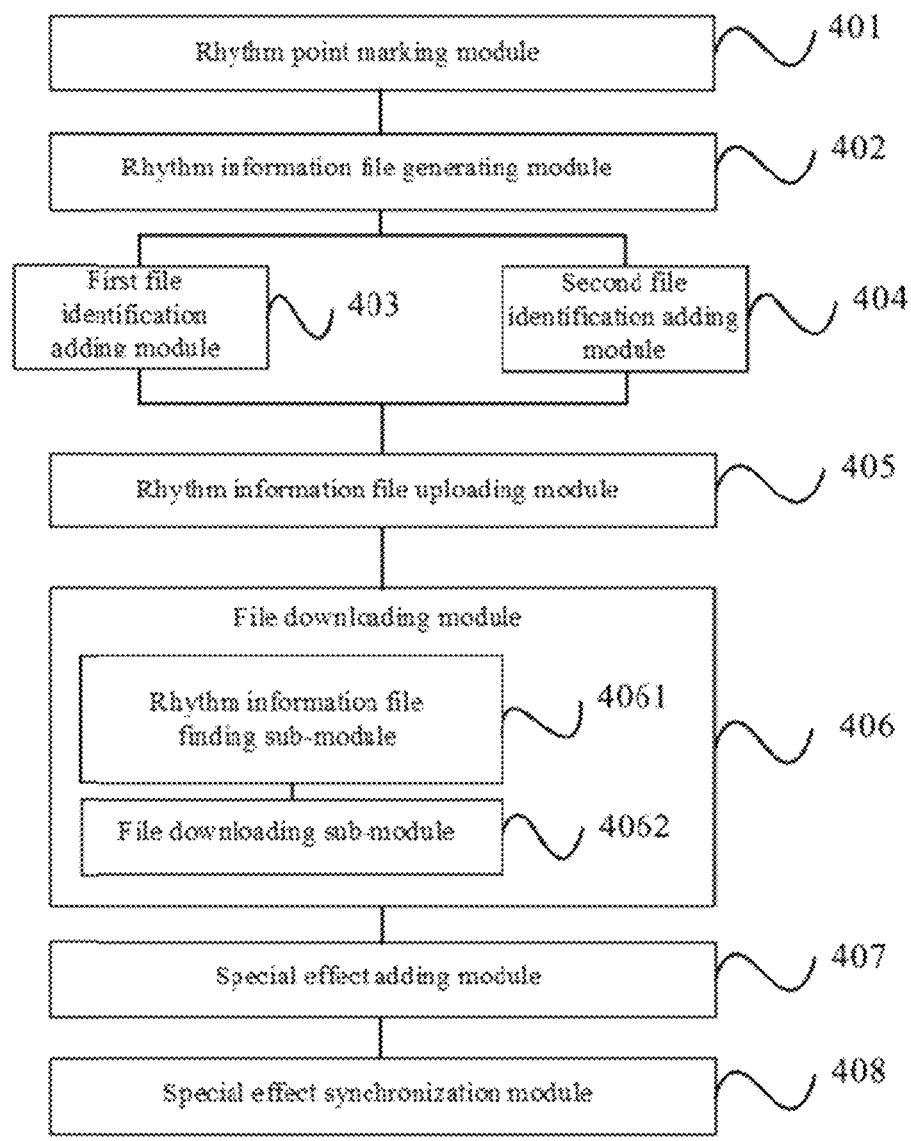
FIG. 3 shows a structural diagram of a special effect synchronization apparatus in Embodiment 3 of the present application.
FIG. 4 shows a structural diagram of a special effect synchronization apparatus of Embodiment 4 of the present application.

Please refer to FIG. 3 which shows a structural diagram of a special effect synchronization apparatus in Embodiment 3 of the present application.

A file downloading module 301 is configured to download a music file selected by the user and a corresponding rhythm information file from a server when a confirmation operation from a user for selecting music for a specified video file is received.

A special effect adding module 302 is configured to play the music file and add a special effect according to the rhythm information file when the specified video file is played.

A special effect synchronization module 303 is configured to synthesize the specified video file, the music file, and the special effect, and store the same after the playback of the specified video file is ended.

In an embodiment of the present application, when a confirmation operation from a user for selecting music for a specified video file is received, a music file selected by the user and a corresponding rhythm information file are downloaded from a server; when the specified video file is played, the music file is played and a special effect is added according to the rhythm information file; and after the playback of the specified video file is ended, the specified video file, the music file, and the special effect are synthesized and stored. Therefore, the problem of low activity of users due to monotonous matched music files can be solved, and a beneficial effect of improving the activity of users is achieved.

Embodiment 3 is a device embodiment corresponding to method embodiment 1. Please refer to Embodiment 1 for detailed description, and the device embodiment will not be repeated redundantly herein.

Embodiment 4

Please refer to FIG. 4 which shows a structural diagram of a mobile terminal of Embodiment 4 of the present application.

A rhythm point marking module 401 is configured to analyze the specified music file in the server, and mark timestamps corresponding to the rhythm points in the specified music file.

A rhythm information file generating module 402 is configured to store the timestamps corresponding to all the rhythm points of the specified music file in the rhythm information file.

A first file identification adding module 403 is configured to add a file identification of the specified music file to a file header of the rhythm information file.

A second file identification adding module 404 is configured to determine a file name of the rhythm information file according to the file identification of the specified music file.

A rhythm information file uploading module 405 is configured to upload the rhythm information file to the server.

A file downloading module 406 is configured to download a music file selected by the user and a corresponding rhythm information file from the server when a confirmation operation from a user for selecting music for a specified video file is received. Optionally, in an embodiment of the present application, the above file downloading module 406 includes:

a rhythm information file searching sub-module 4061, configured to searching for a corresponding rhythm information file from the server according to the file identification of the music file; and a file downloading sub-module 4062, configured to download a music file selected by the user and the rhythm information file from a server.

A special effect adding module 407 is configured to play the music file and add a special effect according to the rhythm information file when the specified video file is played.

A special effect synchronization module 408 is configured to synthesize the specified video file, the music file, and the special effect, and store the same after the playback of the specified video file is ended.

Optionally, in another embodiment of the present application, the above special effect adding module 407 includes:

a special effect adding sub-module 4071, configured to add a special effect when playing to the rhythm point for each rhythm point in the rhythm information file, if the intensity of the rhythm point is greater than a specified threshold.

In an embodiment of the present application, when a confirmation operation from a user for selecting music for a specified video file is received, a music file selected by the user and a corresponding rhythm information file are downloaded from a server; when the specified video file is played, the music file is played and a special effect is added according to the rhythm information file; and after the playback of the specified video file is ended, the specified video file, the music file, and the special effect are synthesized and stored. Therefore, the problem of low activity of users due to monotonous matched music files can be solved, and a beneficial effect of improving the activity of users is achieved. In addition, rhythm points of a music file can also be analyzed in advance, so as to add special effects according to rhythm points.

Embodiment 4 is a device embodiment corresponding to method embodiment 2. Please refer to Embodiment 2 for detailed description, and the device embodiment will not be repeated redundantly herein.

Since a device embodiment is basically similar to a method embodiment, so the description is simple, and for related parts, please refer to part of the descriptions of the method embodiment.

Figure 5:
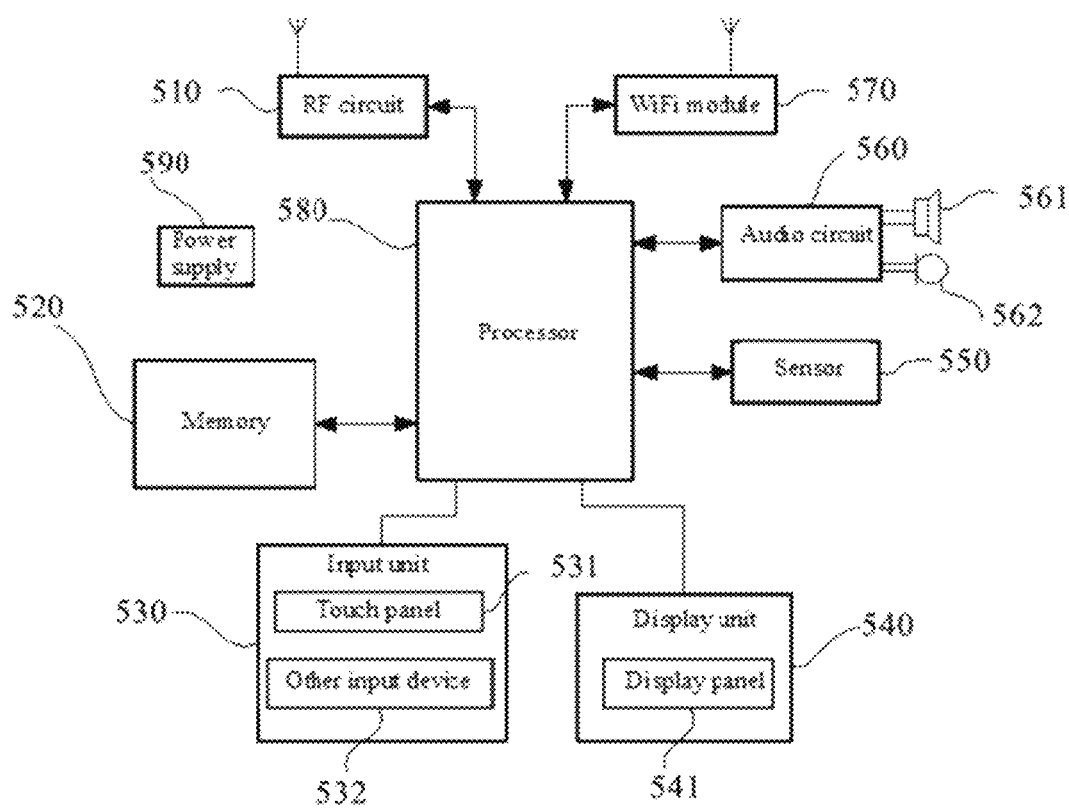
FIG. 5 shows a block diagram of part of structures of a mobile phone related to a mobile terminal provided by an embodiment of the present application.

An embodiment of the present application further provides a mobile terminal. As shown in FIG. 5, to facilitate description, only the part related to the embodiment of the present application is shown, and for those specific technical details not disclosed, please refer to the part of method in an embodiment of the present application. The terminal can be any arbitrary terminal device including a mobile phone, a tablet computer, a PDA (Personal Digital Assistant), a POS (Point of Sales), and a vehicle-mounted computer. The terminal being a mobile phone is taken as an example here.

FIG. 5 shows a block diagram of part of structures of a mobile phone related to a mobile terminal provided by an embodiment of the present application. Please refer to FIG. 5, and the mobile phone includes: an RF (Radio Frequency) circuit 510, a memory 520, an input unit 530, a display unit 540, a sensor 550, an audio circuit 560, a WiFi (wireless fidelity) module 570, a processor 580, a power supply 590 and other parts. Those skilled in the art should understand that, the mobile phone structure shown in FIG. 5 does not constitute a limitation to a mobile phone, and can include parts which are more or less than the parts in the figure, or can combine certain parts, or can arrange different parts.

Each component of a mobile phone is introduced in detail below in combination with FIG. 5.

The RF circuit 510 can be configured to send and receive information or send and receive signals during a call, particularly, the RF circuit 510 receives downlink information of a base station and sends to the processor 580 for processing; in addition, the RF circuit 510 sends designed uplink data to a base station. Generally, the RF circuit 510 includes but is not limited to an antenna, at least one amplifier, a transceiver, a coupler, an LNA (Low Noise Amplifier) and a duplexer. In addition, the RF circuit 510 can also communicate with the network and other devices through wireless communication. The above wireless communication can use any arbitrary communication standard or protocol which includes but is not limited to GSM (Global System of Mobile communication), GPRS (General Packet Radio Service), CDMA (Code Division Multiple Access), WCDMA (Wideband Code Division Multiple Access), LTE (Long Term Evolution), an E-mail, SMS (Short Messaging Service) and the like.

A memory 520 can be configured to store software programs and modules, and the processor 580 is configured to perform various functional applications and data processing of a mobile phone through running software programs and modules stored in the memory 520. The memory 520 can mainly include a storage program area and a storage data area, where the storage program area can store operating systems, and applications required by at least one function (for example, a sound playback function, an image playback function); and the storage data area can store data (for example, voice data, phone book, etc.) created according to use of a mobile phone. In addition, the memory 520 can include a high speed random access memory, and can also include a nonvolatile memory, for example, at least one disk storage device, a flash memory device, or other volatile solid state storage devices.

The input unit 530 can be configured to receive input numeric or character information, and generate keying signal input related to user setting and function control of a mobile phone. Specifically, the input unit 530 can include a touch panel 531 and other input devices 532. The touch panel 531 is also referred to as a touch screen, can collect touch operations of a user on or near the touch panel (for example, operations of a user on or near the touch panel 531 by using any proper objects or accessories such as fingers and touch pens), and can drive corresponding connecting devices according to a preset program. Optionally, the touch panel 531 can also include a touch detection device and a touch controller. Where the touch detection device detects touch direction of a user, detects signals brought by touch operations, and sends the signals to a touch controller; the touch controller receives touch information from a touch detection device, converts touch information into a touch spot coordinate and sends to a processor 580, and receives and executes commands sent from the processor 580. In addition, the touch panel 531 can be realized through various types such as a resistance type, a capacitance type, infrared rays and surface acoustic waves. In addition to the touch panel 531, the input unit 530 can also include other input devices 532. Specifically, other input devices 532 can include but is not limited to one or more of a physical keyboard, a function key (such as a volume control key and a switch key), a trackball, a mouse, and an operating rod.

The display unit 540 can be configured to display information input by a user or information provided to a user and various menus of a mobile phone. The display unit 540 can include a display panel 541, optionally, the display panel 541 can be configured in such forms as LCD (Liquid Crystal Display), OLED (Organic Light-Emitting Diode), etc. Further, a touch panel 531 can cover the display panel 541. When the touch panel 531 detects a touch operation on or near the touch panel 531, the touch operation is sent to the processor 580 to determine the type of the touch event, and then the processor 580 provides corresponding visual output on the display panel 541 according to the type of the touch event. Although in FIG. 5, the touch panel 531 and the display panel 541 serve as two independent parts to realize input and output functions of a mobile phone, however, in some embodiments, the touch panel 531 can be integrated with the display panel 541 to realize the input and output functions of a mobile phone.

The mobile phone can also include at least one sensor 550, such as an optical sensor, a motion sensor and other sensors. Specifically, the optical sensor can include an ambient light sensor and a proximity sensor, wherein the ambient light sensor can adjust the brightness of a display panel 541 according to brightness of the ambient light, and the proximity sensor can turn off the display panel 541 and/or backlight when a mobile phone moves to the ear. As one type of motion sensor, an accelerometer sensor can detect the magnitude of accelerations in all directions (generally three axes), can detect magnitude and direction of gravity during a static state, can be applied to applications of recognition of mobile phone postures (for example, switching between portrait and landscape, related games, and attitude calibration of a magnetometer), and can be applied to functions related to vibration recognition (such as pedometers, knocks); while other sensors, such as gyroscopes, barometers, hygrometers, thermometers, infrared sensors, also equipped on a mobile phone are no longer repeated redundantly herein.

An audio circuit 560, a loudspeaker 561 and a microphone 562 can provide an audio interface between a user and a mobile phone. The audio circuit 560 can transmit the received electric signals after conversion of audio data to a loudspeaker 561, and the electric signals are converted into voice signals and output by a loudspeaker 561; on the other hand, the microphone 562 converts collected voice signals into electric signals, the electric signals are received by an audio circuit 560 and are converted into audio data, the audio data are output to a processor 580 for processing, and the processed audio data are sent to for example another mobile phone through an RF circuit 510, or the audio data are output to the memory 520 for further processing.

WiFi belongs to short-distance wireless transmission technology. A mobile phone can help users to send and receive e-mails, browse webpage, and visit streaming media through a WiFi module 570, and provide to users wireless broadband internet access. Although FIG. 5 shows the WiFi module 570, however, it can be understood that, the WiFi module 570 does not belong to a necessary component of a mobile phone, and can be completely omitted according to requirements within the scope of not changing the essence of the present application.

A processor 580 is a control center of a mobile phone, and is connected with each part of the whole mobile phone by utilizing various interfaces and lines. The processor 580 performs various functions of a mobile phone and processes data through running or executing software programs and/or modules stored in the memory 520 and calling data stored in the memory 520, so as to monitor the mobile phone in an overall manner. Optionally, the processor 580 can include one or more processing units; preferably, the processor 580 can integrate application processors and modem processors, wherein the application processor mainly handles with operating systems, user interfaces, and application programs, while a modem processor mainly handles with wireless communication. It can be understood that, the above modem processor can also not be integrated into a processor 580.

The mobile phone further includes a power supply 590 (for example, a battery) which supplies power to each part, preferably, the power supply can be logically connected with the processor 580 through a power supply management system, so as to realize such functions as management of charging and discharging and management of power dissipation through a power supply management system.

Although not shown, the mobile phone can also include a camera, a bluetooth module, etc., which will not be repeated redundantly herein.

In an embodiment of the present application, the processor 580 contained in the terminal further has the following functions: when a confirmation operation from a user for selecting music for a specified video file is received, downloading a music file selected by the user and a corresponding rhythm information file from a server; when the specified video file is played, playing the music file and adding a special effect according to the rhythm information file; and after the playback of the specified video file is ended, synthesizing the specified video file, the music file, and the special effect, and storing the same.

Optionally, the processor 580 further has the following function: for each rhythm point in the rhythm information file, if the intensity of the rhythm point is greater than a specified threshold, adding a special effect when playing to the rhythm point.

Optionally, the processor 580 further has the following functions: analyzing the specified music file in the server, and marking timestamps corresponding to the rhythm points in the specified music file; storing the timestamps corresponding to all the rhythm points of the specified music file in the rhythm information file; and uploading the rhythm information file to a server.

Optionally, the processor 580 further has the following functions: adding a file identification of the specified music file to a file header of a rhythm information file; or, determining a file name of the rhythm information file according to the file identification of the specified music file.

Optionally, the processor 580 further has the following functions: searching for a corresponding rhythm information file from the server according to the file identification of the music file; and downloading a music file selected by the user and the rhythm information file from a server.

It can be seen that, in an embodiment of the present application, when a confirmation operation of a user for selecting music for a specified video file is received, a music file selected by the user and a corresponding rhythm information file are downloaded from a server; when the specified video file is played, the music file is played and a special effect is added according to the rhythm information file; and after the playback of the specified video file is ended, the specified video file, the music file, and the special effect are synthesized and stored. Therefore, the problem of low activity of users due to monotonous matched music files can be solved, and a beneficial effect of improving the activity of users is achieved. In addition, rhythm points of a music file can also be analyzed in advance, so as to add special effects according to rhythm points.

The present application provides a non-temporary computer readable storage medium configured to enable the mobile terminal to perform a special effect synchronization method when the instructions in the storage medium are executed by a processor of the mobile terminal, wherein the method includes:

when a confirmation operation from a user for selecting music for a specified video file is received, downloading a music file selected by the user and a corresponding rhythm information file from a server;

when the specified video file is played, playing the music file and adding a special effect according to the rhythm information file; and after the playback of the specified video file is ended, synthesizing the specified video file, the music file, and the special effect, and storing the same.

An embodiment of the present application further provides a computer program product containing instructions. When the computer program product is running on a computer, the computer can be enabled to perform the above special effect synchronization method.

Each embodiment in the present description is described in a progressive manner. Each embodiment highlights the differences with other embodiments, and the same and similar parts among each embodiment can be referred to mutually.

The algorithm and display provided herein are not inherently related to any specific computer, virtual system or other devices. Various general-purpose systems can also be used together with teachings based on this. According to the above description, the structures required to construct such type of system are apparent. In addition, the present application is also not aiming at any specific programming language. It should be understood that, various programming languages can be utilized to realize the contents of the present application described herein, and the above description on specific languages is merely for disclosing best implementation mode of the present application.

A large number of specific details are described in the description provided herein. However, it can be understood that, the embodiments of the present application can be practiced without these specific details. In some examples, publically known methods, structures and technologies are not shown in detail, so as not to obscure the understanding of the present description.

Similarly, it should be understood that, in order to simplify the present disclosure and help to understand one or more application aspects, in the description of illustrative embodiments of the present application, the characteristics of the present application are sometimes grouped together into a single embodiment, a figure or the description thereof. However, the method of the present disclosure should not be explained to reflect the following intentions: that is, the present application to be protected claims more characteristics than the characteristics definitely recorded in each claim. More specifically speaking, as reflected in the following claims, the application has less characteristics than all the characteristics of a single embodiment disclosed previously. Therefore, the claims abiding by specific embodiments are hereby explicitly incorporated into the specific embodiment, wherein each claim itself serves as a single embodiment of the present application.

Those skilled in the art can understand that, modules in a device in the embodiment can be changed self-adaptively and the modules can be set in one or more devices different from those in the present embodiment. The modules or units or components in the embodiment can be combined into one module or unit or component, and in addition, they can be divided into multiple sub-modules or sub-units or sub-components. Except that at least some such characteristics and/or processes or units are mutually exclusive, any combination can be adopted to combine all the characteristics disclosed in the present description (including accompanying claims, abstract and drawings) and all the processes or units of any method or device so disclosed. Unless otherwise definitely described, each characteristic disclosed in the present description (including accompanying claims, abstract and drawings) can be substituted by alternative characteristics which provide identical, equivalent or similar purposes.

In addition, those skilled in the art can understand that, although some embodiments described herein include some characteristics contained in other embodiments rather than other characteristics, the combination of characteristics of different embodiments means that the characteristics fall within the scope of the present application and form different embodiments. For example, in the following claims, any of the embodiments to be protected can be used in any arbitrary combined manner.

The individual component embodiments in the present application may be implemented in hardware, or in software modules running on one or more processors, or in a combination of them. Those skilled in the art should understand that, microprocessors or digital signal processors (DSP) can be used in practice to realize some or all of the functions of some or all of the components in the mobile terminal device in the embodiment of the present application. The present application may also be implemented as part or all of the equipment or device programs (for example, computer programs and computer program products) used to execute the methods described herein. Such programs which realize the present application may be stored on a computer readable medium, or may be in a form of having one or more signals. Such signals can be downloaded from Internet sites, or can be available on carrier signals, or can be provided in any other form.

It should be noted that, the above embodiments are used for illustrating the present application rather than limiting the present application, and those skilled in the art may design alternative embodiments without departing from the scope of the attached claims. In the claims, no reference numerals between parentheses shall be constructed to limit the claims. The word "include" does not exclude elements or steps that are not listed in the claims. The word "a" or "one" preceding the element does not exclude the existence of more than one such element. The present application may be realized by means of hardware consisting of a number of different elements and by means of a properly programmed computer. In the unit claims that list a number of devices, a number of these devices can be embodied by the same hardware item. The use of words "first, second, and third" does not indicate any order. These words can be interpreted as names.

Those skilled in the art can be aware that, the unit and algorithm steps of each example described in combination with embodiments disclosed in an embodiment of the present application can be realized through electronic hardware or a combination of computer software and electronic hardware. Whether these functions are performed through hardware or software depends on specific applications and design constraints of technical solutions. Those skilled in the art can use different methods to realize the described function for each specific application, however, such realization should not be deemed as exceeding the scope of the present application.

Those skilled in the art can clearly understand that, to facilitate and simplify description, for the specific operating processes of a system, device and unit described above, please refer to corresponding processes in the above method embodiments, and such specific operating processes will not be repeated redundantly herein.

In an embodiment provided by the present application, it should be understood that, the disclosed device and method should be realized through other manners. For example, the device embodiments described above are merely schematic, for example, the division of units is merely a division of logic functions, and other division manners are available during actual implementation, for example, multiple units or components can be combined or integrated into another system, or some features can be omitted or not performed. As to another point, the displayed or discussed mutual coupling or direct coupling or communication connection can be indirect coupling or communication connection via some interfaces, devices or units, and can also be in electrical, mechanical or other forms.

The units described as a separate part can be or cannot be separated physically, and the parts displayed as a unit can be and cannot be physical units, that is, the parts can be located in one place, or can be distributed in multiple network units. Part or all of the units can be selected to realize the purpose of the solution of the present embodiment according to actual requirements.

In addition, in each embodiment of the present application, the function units can be integrated in a processing unit, each unit can also exist singly and physically, and two or more units can also be integrated in one unit.

If the functions are realized in the form of software function unit and sold or used as independent product, the functions can be stored in a computer readable storage medium. Based on such understanding, the technical solutions of the present application essentially or the part contributing to related art or the part of the technical solution can be embodied in the form of a software product. The computer software products are stored in a storage medium, including several instructions to make a computer device (which can be a personal computer, a server, or a network device, etc.) perform all or part of the steps of the method of each embodiment in the present application. The above storage medium includes: USB flash disk, mobile hard disk, ROM, RAM, diskette or CD-ROM and other media that can store program codes.

What is described above is only specific embodiments of the present application, however, the protection scope of the present application is not limited to this. Those skilled in the art can easily think of changes or substitutions within the technical scope disclosed in the present application, and such changes or substitutions shall fall within the protection scope of the present application. Therefore, the protection scope of the present application shall be subject to the protection scope of the claims.

The invention claimed is:

1. A special effect synchronization method, comprising:
in response to receiving a confirmation operation from a user for selecting music for a specified video file, downloading a music file selected by the user and a rhythm information file corresponding to the music file from a server, wherein the rhythm information file comprises timestamps corresponding to rhythm points of the music file;
in response to playing the specified video file, playing the music file and adding a special effect in the specified video file based on the rhythm information file;
in response to a determination that playback of the specified video file has ended, generating a synthesized file by synthesizing the specified video file, the music file, and the special effect; and
storing the synthesized file.

2. The method of claim 1, wherein adding the special effect in the specified video file based on the rhythm information file comprises:
for each rhythm point in the rhythm information file, when an intensity of the rhythm point is greater than a specified threshold, adding the special effect in the specified video file when playing to the rhythm point.

3. The method of claim 1, wherein before the step of downloading the music file selected by the user and corresponding rhythm information file from the server when the confirmation operation from the user for selecting music for the specified video file, the method further comprises:
analyzing the music file in the server, and marking the timestamps corresponding to the rhythm points in the music file;
storing the timestamps corresponding to all the rhythm points of the music file in the rhythm information file corresponding to the music file; and
uploading the rhythm information file to the server.

4. The method of claim 3, wherein before uploading the rhythm information file to the server, the method further comprises:
adding a file identification of the music file to a file header of the rhythm information file; or, determining a file name of the rhythm information file according to the file identification of the music file.

5. The method of claim 4, wherein downloading the music file selected by the user and the rhythm information file corresponding to the music file from the server comprises:
searching for a corresponding rhythm information file from the server according to the file identification of the music file; and
downloading the music file selected by the user and the rhythm information file from the server.

6. A mobile terminal, comprising a processer; and
a memory configured to store instructions executed by the processor;
wherein the processor is configured to:
download a music file selected by a user and a rhythm information file corresponding to the music file from a server in response to receiving a confirmation operation from the user for selecting music for a specified video file is received, wherein the rhythm information file comprises timestamps corresponding to rhythm points of the music file;
play the music file and add a special effect in the specified video file based on the rhythm information file in response to playing the specified video file is played; and
generate a synthesized file by synthesizing the specified video file, the music file, and the special effect in response to a determination that playback of the specified video file has ended; and
store the synthesized file.

7. The terminal of claim 6, wherein the processor configured to add the special effect in the specified video file based on the rhythm information file is configured to:
for each rhythm point in the rhythm information file, when an intensity of the rhythm point is greater than a specified threshold, add the special effect in the specified video file when playing to the rhythm point.

8. The terminal of claim 6, wherein before downloading the music file selected by the user and the corresponding rhythm information file from the server when the confirmation operation from the user for selecting music for the specified video file is received, the processor is further configured to:
analyze the music file in the server, and marking the timestamps corresponding to rhythm points in the music file;
store the timestamps corresponding to all the rhythm points of the music file in the rhythm information file corresponding to the music file; and
upload the rhythm information file to the server.

9. The terminal of claim 8, wherein before uploading the rhythm information file to the server, the processor is further configured to:
add a file identification of the music file to a file header of the rhythm information file; or, determine a file name of the rhythm information file according to the file identification of the music file.

10. The terminal of claim 9, wherein the processor configured to: download the music file selected by the user and the rhythm information file corresponding to the music file from the server is further configured to:
search for a corresponding rhythm information file from the server according to the file identification of the music file; and download the music file selected by the user and the rhythm information file from the server.

11. A non-temporary computer readable storage medium, configured to enable the mobile terminal to perform a special effect synchronization method when the instructions in the storage medium are executed by a processor of the mobile terminal, wherein the method comprises:
downloading a music file selected by a user and a rhythm information file corresponding to the music file from a server in response to receiving a confirmation operation from the user for selecting music for a specified video file, wherein the rhythm information file comprises timestamps corresponding to rhythm points of the music file;

playing the music file and adding a special effect in the specified video file based on the rhythm information file in response to playing the specified video file;

generating a synthesized file by synthesizing the specified video file, the music file, and the special effect in response to a determination that playback of the specified video file has ended; and storing the synthesized file.

* * * * *